US007810086B2

(12) United States Patent
Murphy et al.

(10) Patent No.: US 7,810,086 B2
(45) Date of Patent: Oct. 5, 2010

(54) SAFE CODE-MOTION OF DANGEROUS INSTRUCTIONS DURING COMPILER OPTIMIZATION

(75) Inventors: Brian R. Murphy, Beijing (CN); Vijay S. Menon, Seattle, WA (US); Tatiana Shpeisman, Menlo Park, CA (US); Ali-Reza Adl-Tabataba, Santa Clara, CA (US); Leaf Petersen, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 1170 days.

(21) Appl. No.: 11/172,675

(22) Filed: Jun. 30, 2005

(65) Prior Publication Data

US 2007/0006187 A1 Jan. 4, 2007

(51) Int. Cl.
*G06F 9/45* (2006.01)
(52) U.S. Cl. .................. 717/159; 717/151; 717/136; 717/140
(58) Field of Classification Search ......... 717/136–140, 717/146, 151–161
See application file for complete search history.

(56) References Cited

U.S. PATENT DOCUMENTS

2004/0019770 A1\* 1/2004 Kawahito .................. 712/227

2005/0257096 A1\* 11/2005 Kielstra ....................... 714/42

OTHER PUBLICATIONS

Suganuma et al., "Overview of the IBM Java Just-in-Time Compiler", IBM Systems Journal, vol. 39, No. 1, 2000.\*
Bellia et al (Higher Order Programming through Java Reflection, Concurrency Specification and Programming 2004, vol. 3, pp. 447-459, 2004).\*

\* cited by examiner

*Primary Examiner*—Lewis A Bullock, Jr.
*Assistant Examiner*—Hang Pan
(74) *Attorney, Agent, or Firm*—Blakely, Sokoloff, Taylor & Zafman LLP (57) ABSTRACT

A compiler can perform aggressive code motion optimization by respecting value dependence of safety values inserted into the intermediate representation of a computer program. In one embodiment, the present invention includes converting a computer program into an intermediate representation, the intermediate representation containing at least one safety check ensuring the safety of at least one dangerous instruction. In one embodiment, the invention further includes defining a safety value in the intermediate representation as the safety check and including the safety value as a safety argument of the dangerous instruction. In one embodiment, it is determined that the safety check is redundant. In response, in one embodiment, the invention includes updating the safety argument of the dangerous instruction, and eliminating the safety check from the intermediate representation during the safety check elimination optimization. Other embodiments are described and claimed.

11 Claims, 10 Drawing Sheets

Figure 1

PRIOR ART

SAFE CODE-MOTION OF DANGEROUS INSTRUCTIONS DURING COMPILER OPTIMIZATION

This application is related to U.S. patent application Ser. No. 11/172,676, filed Jun. 30, 2005 entitled "Safety verification of computer program."

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

BACKGROUND

1. Field

Embodiments of the present invention relate generally to the field of compiler optimization. More particularly, embodiments of the present invention relate to maintaining safety dependencies during compiler optimization.

2. Description of the Related Art

A compiler is software that translates a computer program written in a high-level language (such as Java, C++, or C#) into machine language. For interpreted languages such as Java and Visual Basic, the high-level programming language is first translated into bytecode or some other similar code distribution format. During compilation—which may occur at run time in the case of a "just-in-time" compiler—the complier translates the bytecode or distribution format code of the computer program into an intermediate representation. The compiler may perform various processing functionalities on the intermediate representation of the program, such as optimization, before the intermediate representation is converted into machine code which can be executed.

In safe computer languages, the compiler inserts various safety checks into the code while creating the intermediate representation. For example, in a type-safe and memory-safe language such as Java and C#, the compiler will insert null checks, type checks, array-bounds and other valid address checks, array compatibility checks that ensure that a reference value stored into an array element is compatible with the array type, and arithmetic checks for arithmetic operands causing overflow conditions, for example, a zero denominator in integer division for Java, and various other conditions causing overflow in the CLR virtual machine for C#.

After the initial intermediate representation is created, the compiler performs a number of optimizations to create an optimized intermediate representation. These optimizations make the code more efficient, conserve memory, eliminate redundant code, and perform other procedures to improve the performance of the computer program. Some well-known optimizations include redundancy elimination optimizations—such as redundant checknull or bounds check elimination, common subexpression elimination,—code motion optimizations—such as hoisting loop invariant expressions out of loops and sinking stores,—algebraic techniques to convert computations to a less expensive form—such as strength reduction of loop induction variables,—and value propagation optimizations—such as constant propagation, copy propagation, and forward substitution.

One problem with existing compilers is that some optimizations can remove some of the safety checks inserted by the compiler. While these removed safety checks were removed because they were redundant, and their removal should not affect the execution of the computer program (assuming the compiler was bug-free), the removal of these safety check makes it difficult and very time consuming to verify the safety of optimized intermediate representation code.

Another problem with existing compilers is that code-motion of dangerous instructions is restricted to assure safety. However, these restrictions are usually far more restricting than necessary. What is needed, is a compiler able to generate verifiable intermediate representation code. Furthermore, what is needed, is a compiler able to use aggressive predictive code-motion optimization on dangerous operations without the use of hardware checks.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

Dangerous Instructions and Safety Checks

Intermediate representations (IRs) used by compilers are well-known in the art. Examples include the RTL representation and tree SSA representations used by $GCC_{[brm1]}$, the Stanford University Intermediate Format (SUIF) representation$_{[brm2]}$, the Pegasus intermediate representation$_{[brm3]}$, the WHIRL intermediate representation of the MIPSpro Compiler from Silocon Graphics Incorporated. These various intermediate representations carry out instructions that are similar in nature, though the nomenclature might differ from one intermediate representation to the next. In this description, Java IR will be used as an example. However, the various embodiments of the invention can be adapted for any other suitable publicly available or privately developed intermediate representation.

Figure 1:
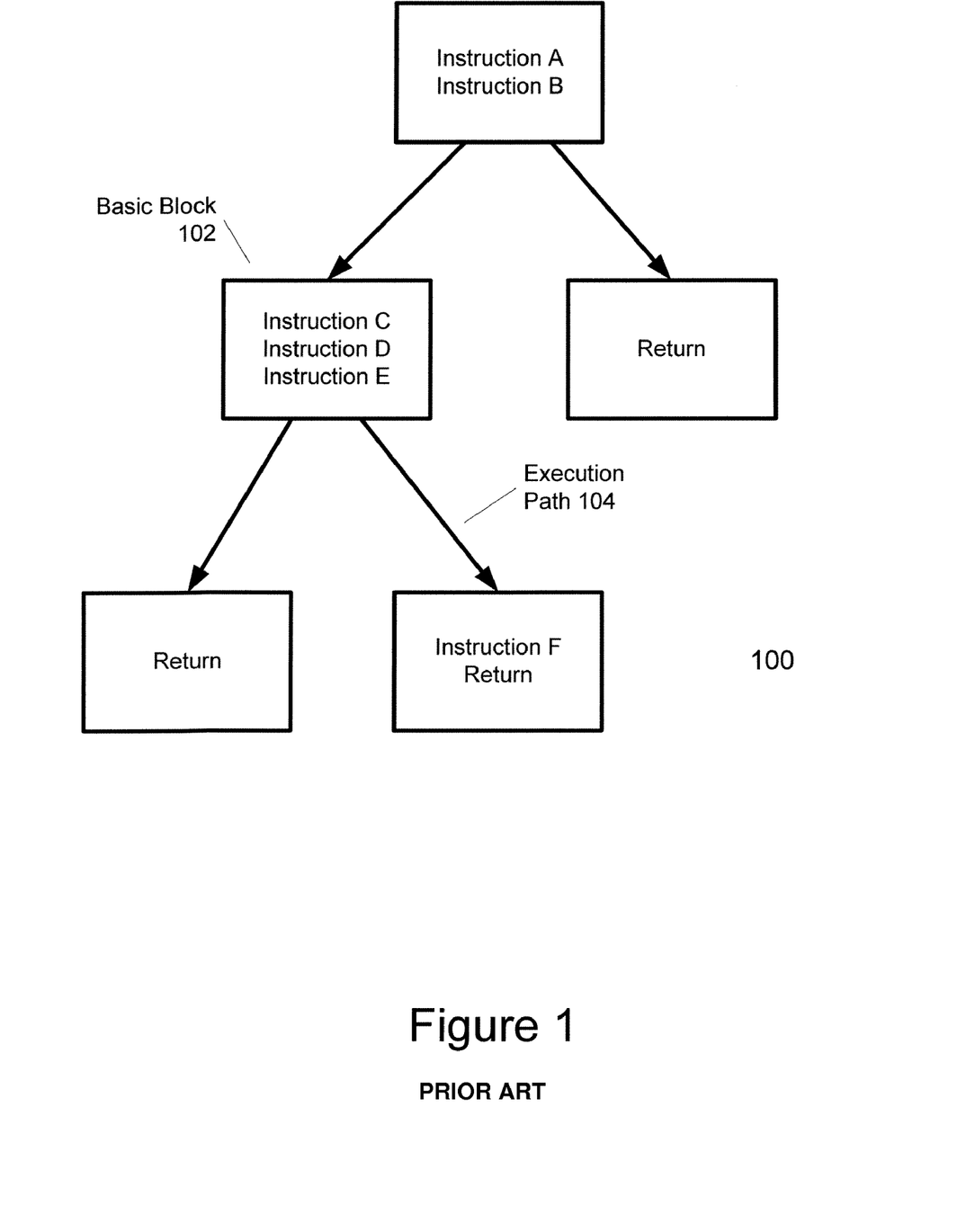
FIG. 1 is a block diagram illustrating conventional representations of an intermediate representation of a computer program used by a compiler.

The intermediate representation of a program thus consists of various instructions organized by execution path. The intermediate representations are generally represented graphically as—for example—in FIG. 1. FIG. 1 illustrates the control flow graph 100 of the intermediate representation of a very simple program or subroutine. The six instructions—Instructions A-F—are organized into execution paths 104 by using basic blocks 102. If a basic block 102 is reached in an execution path, the instructions in the basic block 102 are executed. The Returns signify the end of the program, where a value may be returned by the program.

Some instructions result in branching. For example, Instruction B may be a "compare_branch" instruction that takes one path if the comparison results in a match and another path if it does not. Other branch instructions may branch to more than two paths. Some of the instructions in the intermediate representation are safety checks inserted into the intermediate representation by the compiler during the compile process.

In general, for the purposes of instruction safety, there are three types of instructions. The first type of instructions is "always safe" instructions, instructions that have no visible side effects at execution time. Such always safe instructions include addition (without overflow detection). Adding two values can be performed at any time during execution. The second type of instructions is "always unsafe" instructions, instructions that have visible side effects at execution time. Such always unsafe instructions include stores and returns. For example, none of the returns in FIG. 1 can be moved to a different execution path 104 without affecting the functionality of the program.

The third type of instructions is "dangerous" instructions, instructions that are sometimes safe and sometimes unsafe. Such dangerous instructions include divides and loads. For example, a divide instruction will fail when the divisor is zero, but is safe otherwise. Similarly, a load instruction (which loads a value at some memory address into the processor) will fail on an invalid address, but has no visible external effects otherwise.

For a type and memory-safe language such as Java, during compilation, the compiler inserts safety checks to guarantee the safety of dangerous instructions. For example, div (a,b)—division of a by b—is a dangerous instruction that faults when b is zero. Thus, to guarantee that b is not zero, the compiler will insert a safety check immediately preceding the dangerous instruction in the execution path, such as checkzero b. The checkzero safety check makes sure that b is not zero before the divide is executed. If b is zero, the checkzero check throws an exception to exit the program in a safe manner.

There are various other safety checks. One example safety check is "checknull," which makes sure than an object reference points to an object (otherwise, in Java, it will have the special value "null"). If an object reference is null then it does not refer to an object, and later attempts to load or store from fields using the reference will likely fault at runtime. Another safety check is the "array bound check," which makes sure that array index is within the array bounds. Yet another is a "type check," which makes sure that an object has a certain type, and other common safety checks are well known by those skilled in the art. New safety checks may also be developed in the future, with new names and functionalities.

The safety check guarantees the contextual safety of the dangerous instruction. During optimization, it may be beneficial to move the dangerous instruction. For example, referring to FIG. 1, it may be advantageous to move Instruction D into the basic block above its current one. However such code motion may not be allowed, since a dangerous instruction cannot be moved above its corresponding safety check.

Safety Dependency and Safety Values

One concept used by programming languages and compilers is "value dependence." Value dependence means that a value must be defined before it is used. The definition must precede the use in execution, thus the use of a value is dependent on having been previously defined. Code motion must respect value dependence for all compilers.

Another concept used by compilers is "control dependence." Control dependence means that instructions cannot be moved above branches where they did not exist. For example, the return instruction on the second level in FIG. 1 cannot be moved to the basic block preceding its basic block. Respecting control dependence is a safe and conservative method of operation during optimization, however, it is overly constraining on aggressive code motion optimizations.

In this application, the concept of "safety dependence" is introduced. Safety dependence means that the contextual safety of a dangerous instruction depends on some branch or path being taken, or being at some point in execution. For example, if Instruction B in FIG. 1 is a branch that necessitates that value b is not zero, and Instruction F is a divide by value b, that Instruction F depends on the execution having taken the left branch at Instruction B. Thus, there is a safety dependence between Instruction B and Instruction F.

Figure 2:
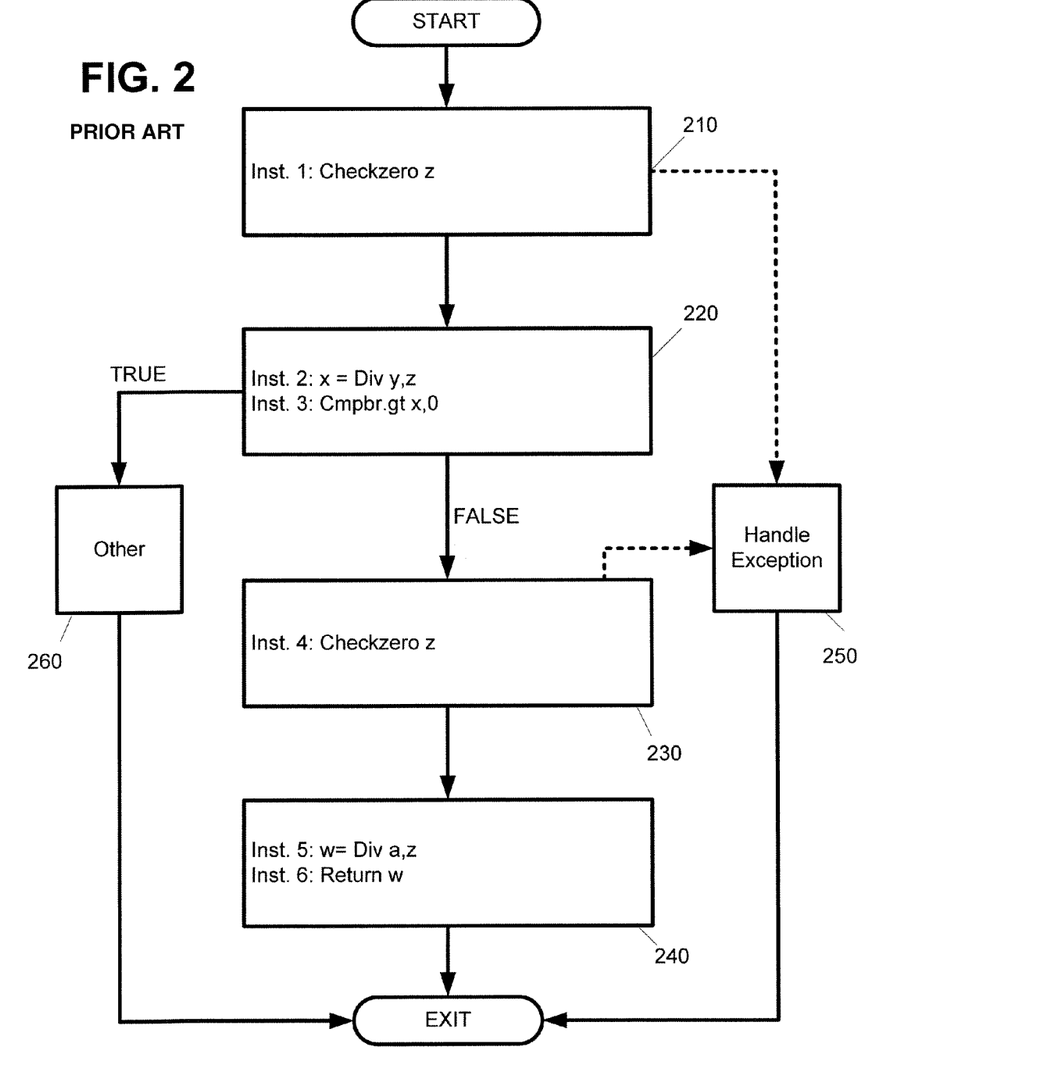
FIG. 2 is a block diagram illustrating and example intermediate representation of a computer program.

In one embodiment, the present invention represents safety dependencies as value dependencies. Two simplified examples of an embodiment of the invention are now provided to assist in the understanding of the invention. The first example is now described with reference to FIGS. 2-4. For the first example, the sample computer program (or program fragment) as written in Java is:

```
x = y / z;
if (x <= 0) {
    w = a / z;
    return w;
} else
    [other instructions]
}
```

FIG. 2 illustrates the intermediate representation of this example computer program with safety checks inserted, as it would be done by a prior art compiler. For example, instruction 3 (Inst. 3 in basic block 220) is a compare-branch instruction that takes the TRUE branch 260 if the first operand (x) is greater than the second operand (0) and the FALSE branch 230 otherwise. This is the IR version of if (x<=0) in the program above. Instructions 1 and 4 are safety checks inserted by the compiler. Since instructions 2 (in block 220) and 5 (in block 240) both contain a division by z, instructions 1 and 4 check if z is zero before each division to prevent a zero divisor.

Figure 3:
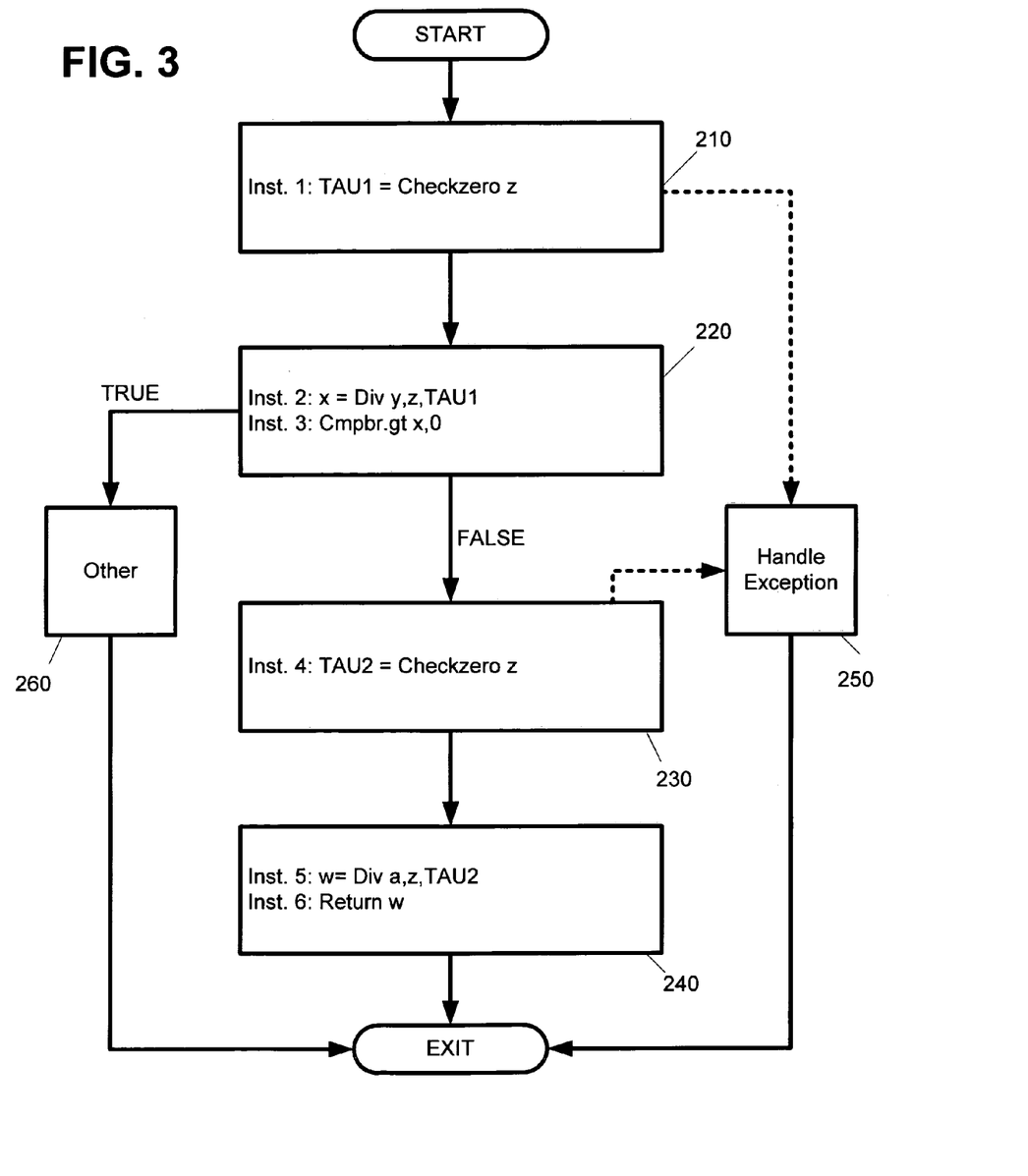
FIG. 3 is a block diagram illustrating safety values used in an intermediate representation of a computer program according to one embodiment of the present invention.

FIG. 3 illustrates safety value insertion according to one embodiment of the present invention. In one embodiment, a safety condition can be represented by a value in association with a safety check. In this description, these safety values are referred to as TAU values, and different TAU values are denoted with numerals such as TAU1, TAU2, and so one. These names are merely a convenient way to keep the safety values distinct from other variables in this description. The safety values can have any representation allowed in the IR.

One embodiment of how safety values function is now illustrated with reference to basic blocks 210 and 220 of FIG. 3. Instruction 1 in basic block 210 assigns to the safety value TAU1 the condition that Checkzero z was performed without exception. Thus, TAU1 implicitly stands for fact that z is not zero. In one embodiment, if z is zero the checkzero check throws an exception to exit the program in a safe manner, 250.

Instruction 2 in basic block 220 shows that the divide operation has been overloaded to accept an additional argument in the form of a safety value. This may be referred to as a "safety argument," or by any other descriptive name. In effect, instruction 2 states that the division is contextually safe because TAU1 is defined. The definition of TAU1, as explained above, is the condition that z is not zero. Thus, as long as instruction 2 which uses the safety value TAU1 appears after the definition of TAU1, instruction 2 is contextually safe.

This is the same requirement for value dependency. Thus, a safety dependency has been established by representing contextual safety as a value dependency. Since all complier must ensure value dependency, contextual safety can be ensured merely by following value dependency. TAU2 similarly is defined in instruction 4 and appears in instruction 5 as the reason instruction 5 is contextually safe.

Figure 4:
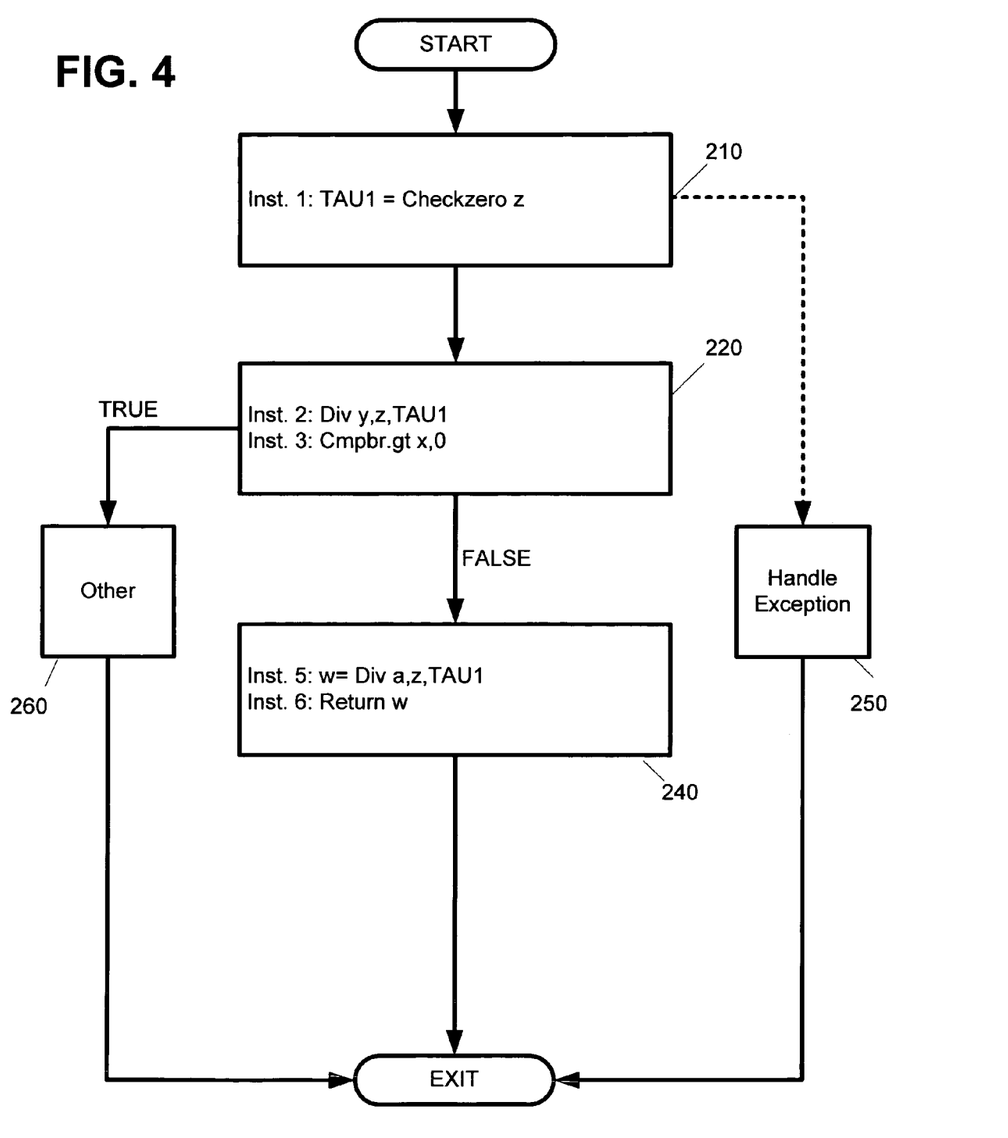
FIG. 4 is a block diagram illustrating safety values after safety check elimination optimization as used in an intermediate representation of a computer program according to one embodiment of the present invention.

One benefit of establishing safety dependencies using safety values can be seen when checkzero elimination optimization is performed on the IR. FIG. 4 shows the IR after checkzero elimination. Since there were two serial Checkzero z instructions in the code, the second one (instruction 4) has been eliminated as redundant.

In a prior art compiler, there would now be no easy way to retroactively determine why instruction 5 is contextually safe. This is not apparent in the small example shown in FIG. 4, since the first safety check (instruction 1) appears visually close to instruction 5. However, in a substantial real world program, the safety check that ensures the safety of an instruction may be very far in the code from the instruction it makes contextually safe after the redundant safety checks have been eliminated.

In one embodiment of the present invention, when a safety check is eliminated as redundant, the safety value defined by the eliminated safety check is switched to the safety value defined by the safety check that made the eliminated safety check redundant. In FIG. 4 for example, when instruction 4 is eliminated as redundant in light of instruction 1, the safety value defined by the eliminated safety check (TAU2) is replaced by the safety value defined in instruction 1, which is TAU1. Thus, in instruction 5, TAU1 now appears instead of TAU2 as the reason that instruction 5 is contextually safe.

Since the safety dependence of instructions 2 and 5 on instruction 1 is explicitly represented as value dependence of TAU1, code motion optimization is made simpler. During code motion optimization of the dangerous instructions 2 and 5, the compiler only needs to respect value dependence to guarantee the contextual safety of the dangerous instructions. Since value dependence must be respected for all values and variables, this does not add significant processing burden to the compiler, yet allows for maximum aggressive code motion.

Figure 6:
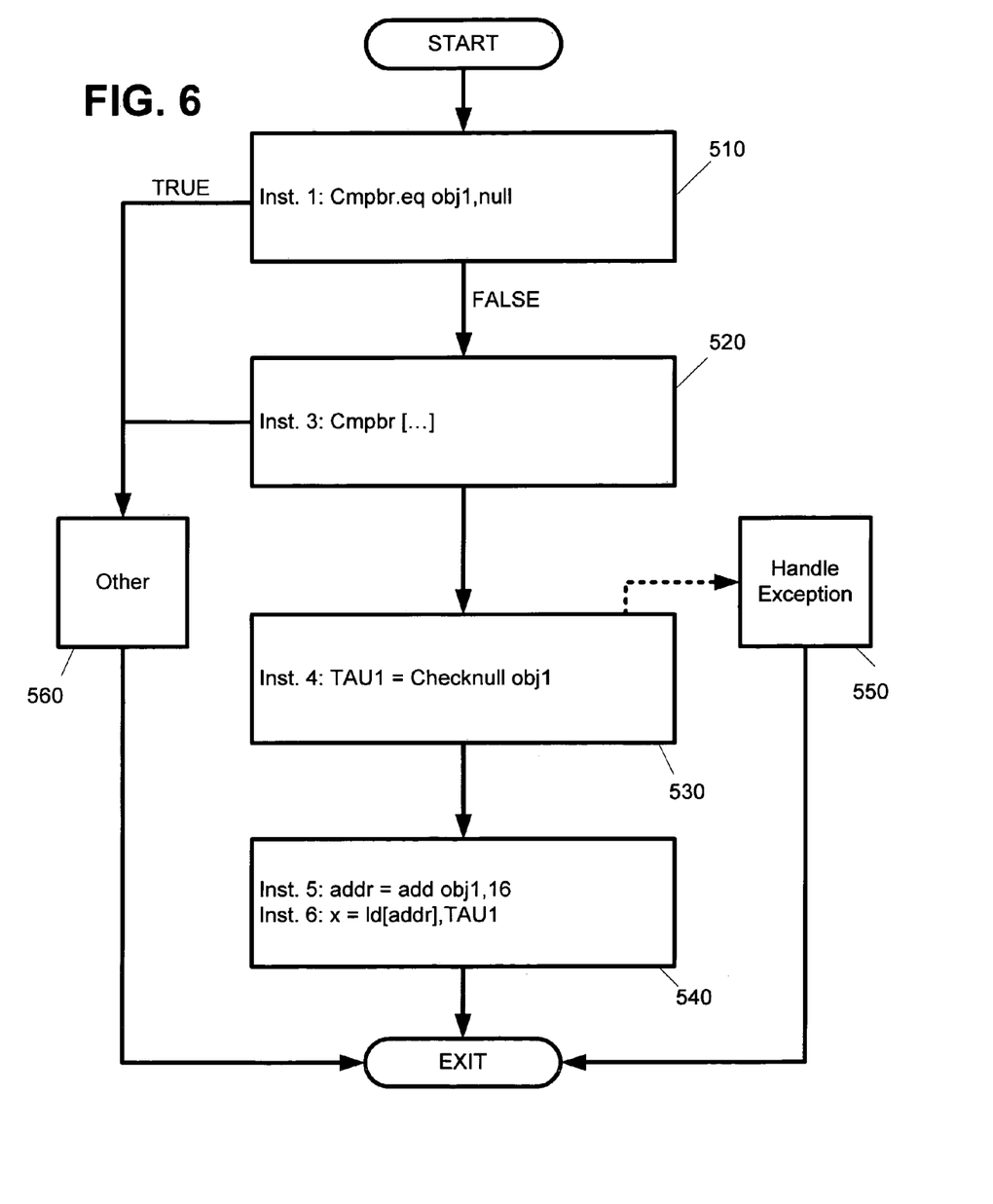
FIG. 6 is a block diagram illustrating safety values used in an intermediate representation of the second computer program according to one embodiment of the present invention.
Figure 7:
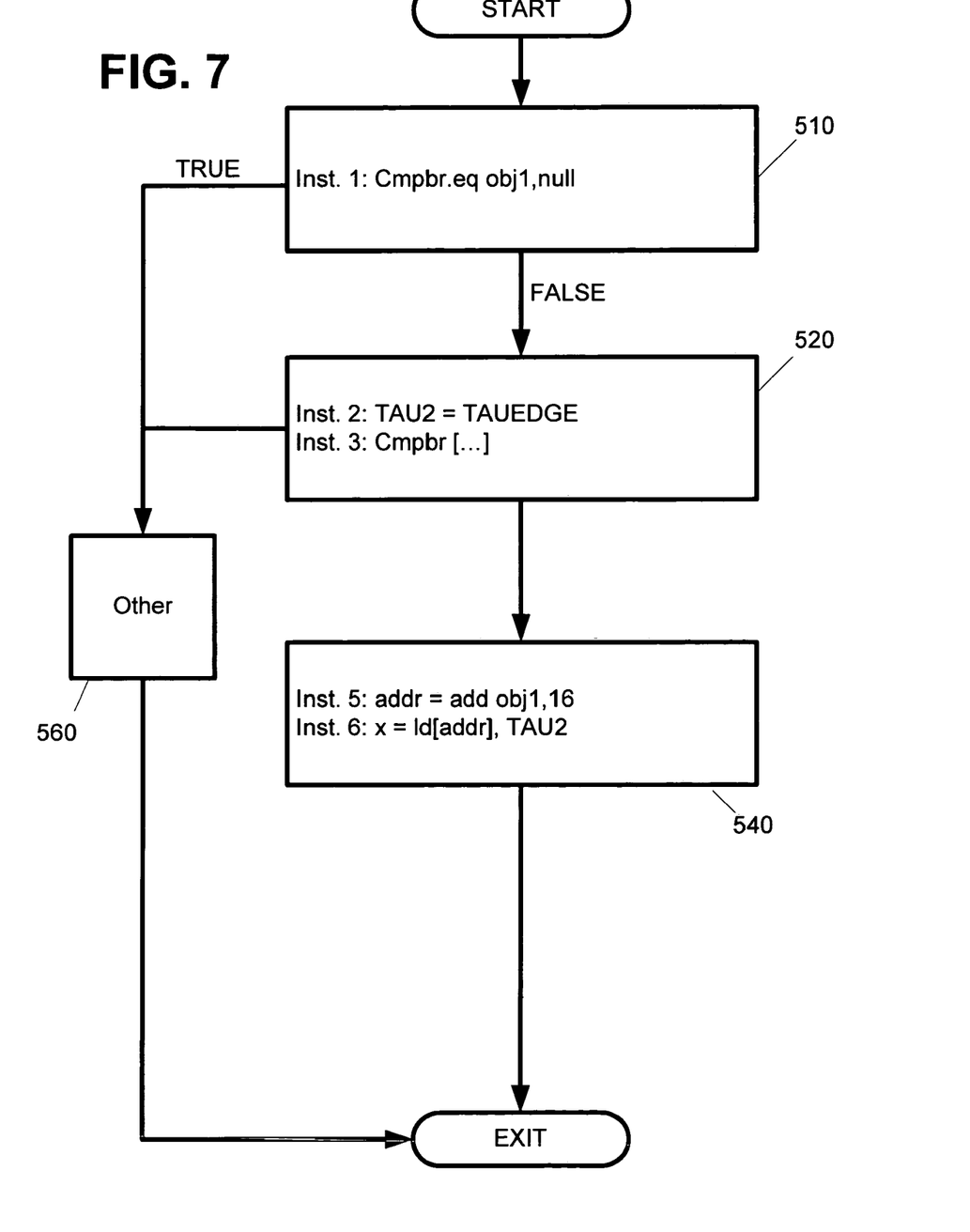
FIG. 7 is a block diagram illustrating safety values after safety check elimination optimization as used in an intermediate representation of the second computer program according to one embodiment of the present invention.

This first example demonstrated the basic concept of safety dependency represented as value dependency. The second example illustrates another variation of this concept. In the first example, the contextual safety of a dangerous instruction was provided by a safety check. In the second example, having taken a branch in an execution path provides the contextual safety. For such a type of contextual safety, the concept of TAUEDGE will be introduced later. The example computer program in this second example discussed with reference to FIGS. 5-7 is:

```
if (obj1 != null) {
    if ( [some other condition]) {
        x = obj1.f; // comment: field f is at offset 16
    }
}
```

Figure 5:
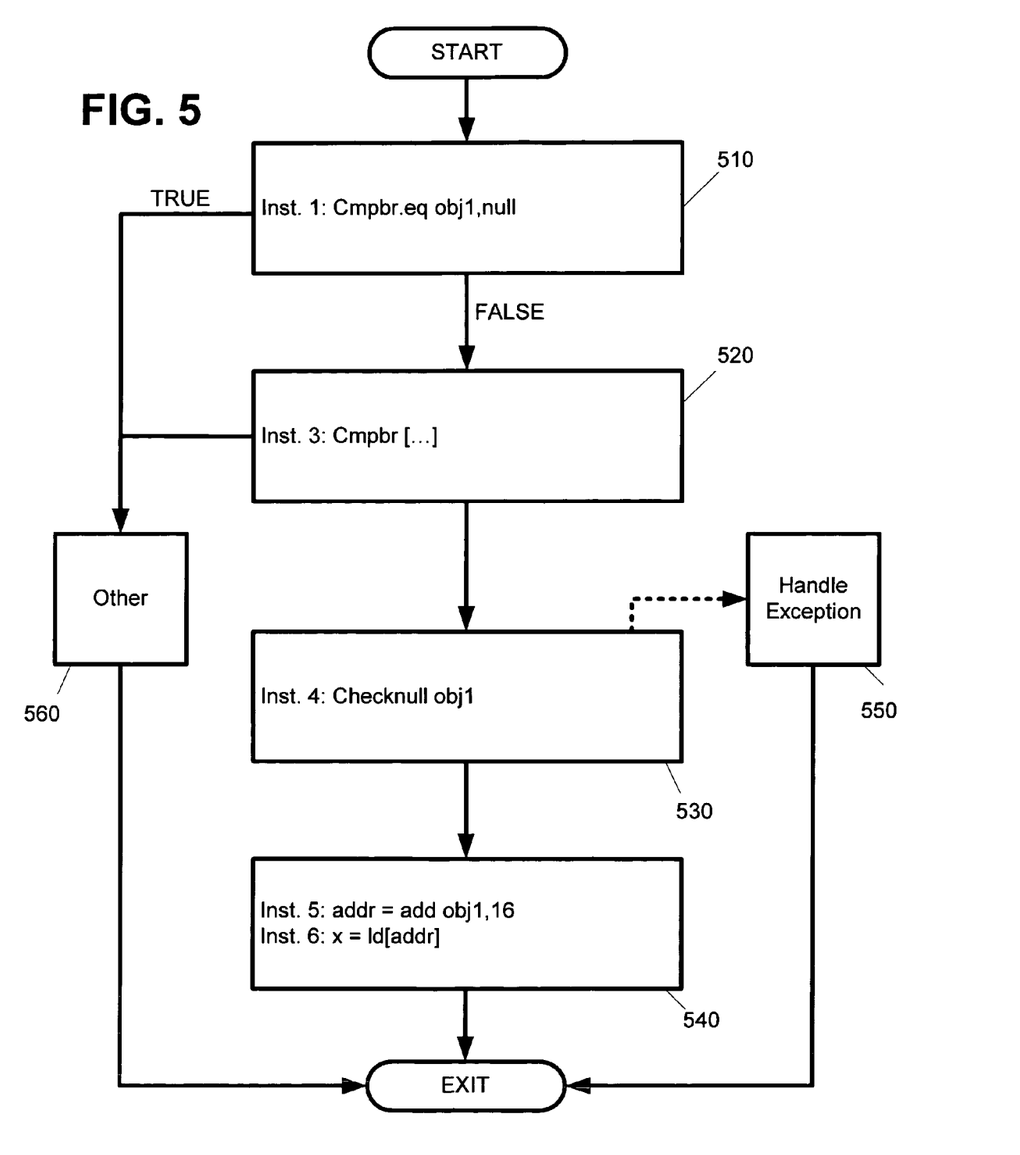
FIG. 5 is a block diagram illustrating a second example intermediate representation of a computer program.

FIG. 5 illustrates the intermediate representation of this second example computer program with safety checks inserted, as it would be done by a prior art compiler. For example, instruction 1 (Inst. 1 in basic block 510) is a compare_branch instruction that takes the TRUE branch (to block 560) if the first operand (obj1) is equal to the second operand (null) and the FALSE branch (to block 520) otherwise. This is the IR version of if (obj1!=null) in the program above. Instruction 4 (in block 530) is a safety check inserted by the compiler. Since instruction 6 (in block 540) is a load operation used to load the field f (at offset 16) of the object referred to by obj1, instruction 4 checks if obj1 is null before the object reference is used. In one embodiment, if obj1 is null an exception is thrown to exit the program in a safe manner, 550.

An example of how safety values function is now illustrated with reference to FIG. 6. Instruction 4 in basic block 530 assigns to the safety value TAU1 the condition that Checknull obj1 was performed without exception. Thus, TAU1 implicitly stands for fact that object reference obj1 is not null and therefore refers to an object.

Instruction 6 in basic block 540 shows that the load operation has been overloaded to accept an addition argument in the form of a safety value. In effect, instruction 6 states that the load is contextually safe because TAU1 is defined. The definition of TAU1, as explained above, is the condition that obj1 is not equal to null. Thus, as long as instruction 6 which uses the safety value TAU1 appears after the definition of TAU1, instruction 6 is contextually safe.

Thus, another safety dependency has been established by representing contextual safety as a value dependency. One benefit of establishing safety dependencies using safety values can be seen when checknull elimination optimization is performed on the IR. FIG. 7 shown the IR after checknull elimination. Since Checknull obj1 instruction is redundant in light of the fact that the execution path in which it lies includes a branch (Instruction 1) that is only taken if obj1 is not equal to null, instruction 4 has been eliminated.

However, the fact that ensures contextual safety of instruction 6 is now represented by another safety value: TAU2. TAU2 is defined as a special TAU value here referred to descriptively as TAUEDGE. In one embodiment, a TAUEDGE represents one edge of a branch taken. Other descriptive names could also be used.

Therefore, the definition of TAU2 is that in instruction 1 the FALSE branch was taken. Taking the FALSE branch of instruction 1 ensures that obj1 does not equal null. Thus, so long as obj1 is used in an execution path taking that branch, load instructions concerning obj1 are contextually safe.

To represent this using the safety values, TAU2 is defined as a TAUEDGE. In one embodiment, this means that the instruction preceding the TAUEDGE was a branch—such as a compare_branch,—and the TAUEDGE means that the path in which the TAUEDGE appears was taken. In instruction 6, the new safety value TAU2 is substituted for TAU1 to show the updated safety dependence. Now, instruction 6 is contextually safe so long as TAU2 is defined.

As in the first example, in a prior art compiler, there would now be no easy way to retroactively determine why instruction 6 is contextually safe after checknull elimination. This may not be apparent in the small example shown in FIG. 7, since the compare_branch instruction (instruction 1) appears visually close to instruction 6. However, in a substantial real world program, the safety check that ensures the safety of an instruction may be very far in the code from the instruction it makes contextually safe after the redundant safety checks have been eliminated. Instruction 3 is meant to illustrate that there may be various other instructions between the TAUEDGE and the use of the safety value defined as a TAUEDGE.

As explained above, in one embodiment of the present invention, when a safety check is eliminated as redundant, the safety value defined by the eliminated safety check is switched to the safety value defined by the safety check that made the eliminated safety check redundant. In FIG. 7 for example, when instruction 4 is eliminated as redundant in light of instruction 1, the safety value defined by the eliminated safety check (TAU1) is replaced by the safety value defined in instruction 2, which is TAU2. Thus, in instruction 6, TAU2 now appears instead of TAU1 as the reason that instruction 6 is contextually safe.

Since the safety dependence of instruction 6 on instruction 2 is explicitly represented as value dependence of TAU2, code motion optimization is made simpler. During code motion optimization of the dangerous instructions 6, the compiler only needs to respect value dependence—something most compilers already do—to guarantee the contextual safety of the dangerous instructions.

Figure 8:
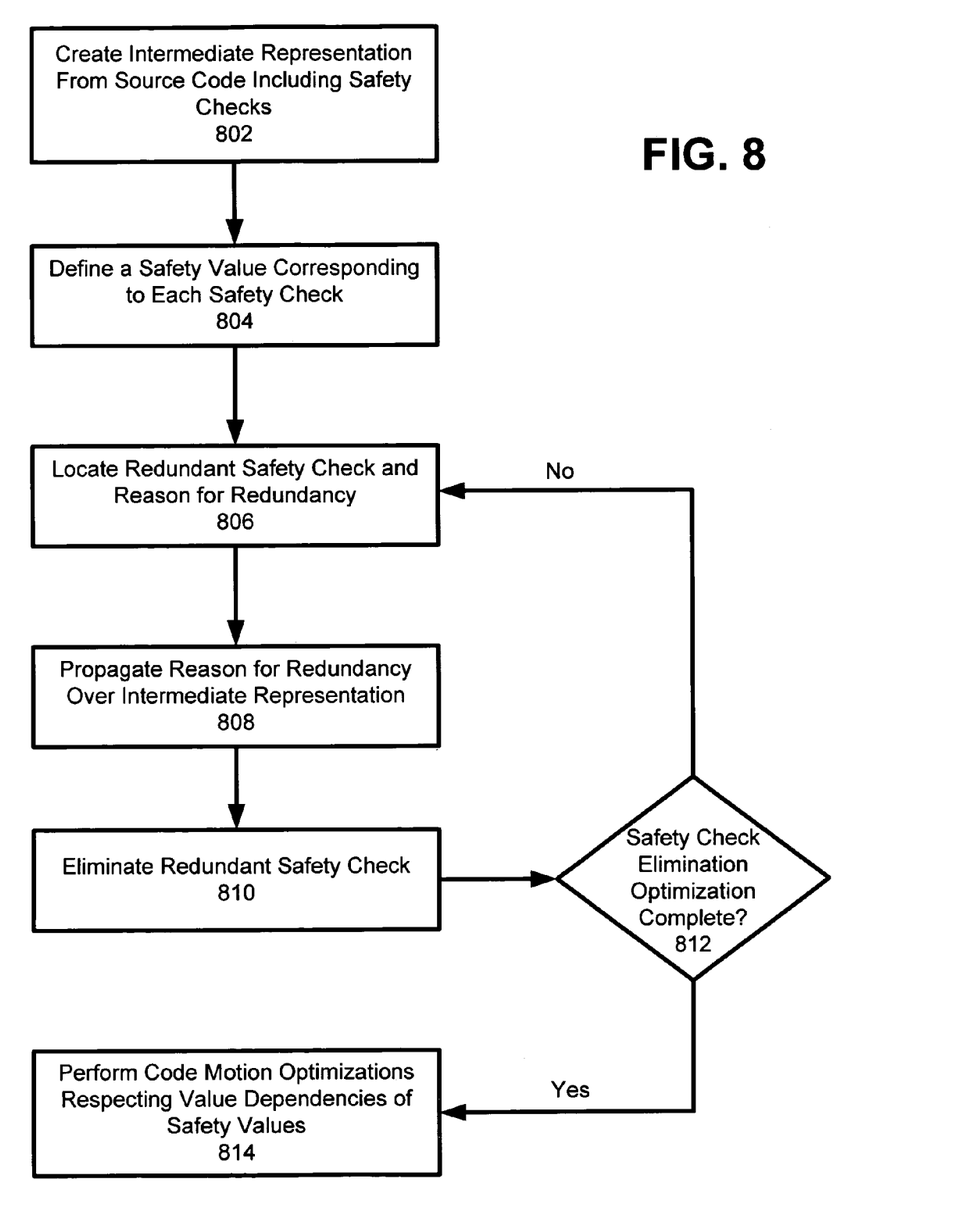
FIG. 8 is a flow diagram illustrating compiler optimization processing according to one embodiment of the present invention.

With these two examples in mind, one embodiment of the present invention can now be described in more general terms with reference to FIG. 8. FIG. 8 is a flow diagram of compiler processing according to one embodiment of the present invention. In block 802, the compiler creates the IR from the received bytecode or source code of a computer program and inserts safety checks as appropriate, this being a typesafe programming language.

In block 804, each safety check is used to define a safety value as seen in the two examples. These safety values are referred to as TAU values here, but could have any other names. In block 806-812 safety check elimination optimizations are performed, such as checkzero and checknull eliminations.

In block 806, a redundant safety check is located and slated for elimination. The reason for the redundancy is automatically identified when redundancy is determined. For example, instruction 4 in FIG. 3 is redundant because of instruction 1. In block 808, the reason for the redundancy is propagated over the intermediate representation. In one embodiment, this includes replacing the safety value defined as with the redundant instruction with the safety value defined as the reason for the redundancy. It can further include defining TAUEDGE and other such values to represent the reasons for some redundancies. Then, in block 810, the redundant safety check is eliminated.

In block 812 a determination is made as to whether safety check elimination optimization is complete. If not, then the next redundant safety check is located in block 806 and processing continues as described above. If safety check elimination is complete, then, in block 814, code motion optimizations are performed that only need to respect the value dependencies of the safety values to enforce the safety dependencies allowing for aggressive code motion of dangerous but contextually safe instructions.

The TAUEDGE mechanism introduced in the second example above allows safety value representation when a safety check is eliminated based on a branch condition. Other types of similar mechanism can also be implemented to deal with other circumstances. For example, in the examples above, only checknull and checkzero safety checks were represented using TAU safety values. However, one of ordinary skill in the art would understand how to apply safety values to other similar safety checks such as checkbounds, checkdivisionoperands, checkelementtype, and checkfinite. Furthermore, multiple safety values can be used to represent contextual safety using some TAU addition mechanism.

Another advantage of safety values as described above is that the safety of a computer program or optimized intermediate representation can be proven. Optimized intermediate representation is one practical method for storing and distributing software. When downloading software from the Internet, one key security concern is the safety of the downloaded code. The downloaded code may be unsafe for malicious reasons or due to programming error or compiler error.

As explained above, without safety values and the concept of safety dependence, it can be very difficult and extremely time consuming to verify the contextual safety of dangerous instructions in optimized intermediate representation of bytecode, because the safety check that once made an instruction safe may have been eliminated as redundant in light of another instruction located far from the dangerous instruction in the intermediate representation. The blocks of FIG. 8 can be performed by various compiler modules that may be given descriptive names such as "safety value generator," and the like.

Figure 9:
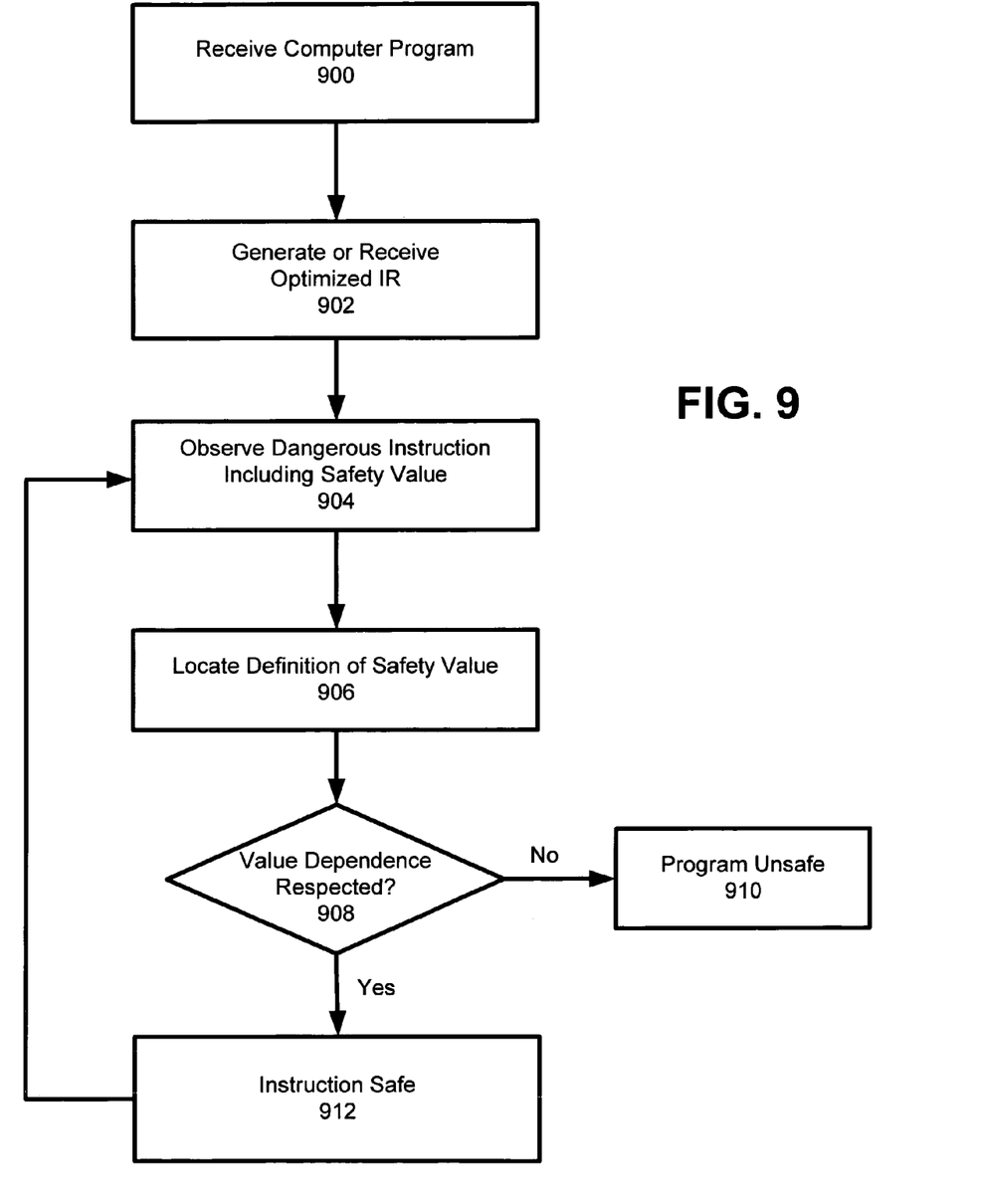
FIG. 9 is a flow diagram illustrating program safety verification processing according to one embodiment of the present invention.

One embodiment of using safety values to verify the safety of a computer program is now described with reference to FIG. 9. In block 900 the compiler receives a computer program. The computer program may be in any distribution format such as bytecode, or even high level code. In block 902, the optimized intermediate representation is generated. Alternately, the optimized intermediate representation may be the format in which the program was received. For example, the optimized intermediate representation may be software downloaded from the Internet.

Before the received code is executed, safety verification is performed. To that end, in block 904 a dangerous instruction is observed. In one embodiment, all dangerous instructions include a safety value (such as a TAU value discussed above). The safety value relates back to the reason why the dangerous instruction is contextually safe, such as a TAU defined as a safety check or a TAUEDGE or some other safety context representation.

In block 906, the definition of the safety value found in the dangerous instruction is located. The safety value may be defined as a safety check, a contextual representation such as the TAUEDGE mechanism, or some other contextual safety representation. In block 908 a determination is made as to whether safety value as it appears in the dangerous instructions respects value dependence. Based on the respective locations of the dangerous instruction and the definition of the safety value, this is a relatively easy determination to make.

If in block 908 it is determined the value dependence was not respected with regard to this dangerous instruction, then, in block 910 the received computer program is found unsafe and is not executed. A user of the machine containing the unsafe program may be alerted as to why the program was not executed and warned about the dangers associated with the unsafe program.

However, if in block 908 it is determined the value dependence was respected with regard to this dangerous instruction, then, in block 912 the dangerous instruction is found unsafe and processing continues at block 904 until all dangerous instruction have been checked. If all dangerous instructions check out as contextually safe based on the safety dependencies represented explicitly as value dependencies, then the received program is deemed safe and may be executed. The blocks of FIG. 9 may be performed by a compiler or a computer program verifier implemented independent of the compiler, a combination of the two, or some other modular architecture.

Example Computer System

Various embodiments of the present invention have been described in the context of a compiler that generates intermediate representation, or a virtual machine that executes (interprets) intermediate representation. An example computer system on which such compiler and/or virtual machine can be implemented in now described with reference to FIG. 10. Computer system 1800 that may be used to perform one or more of the operations described herein. In alternative embodiments, the machine may comprise a network router, a network switch, a network bridge, Personal Digital Assistant (PDA), a cellular telephone, a web appliance or any machine capable of executing a sequence of instructions that specify actions to be taken by that machine.

Figure 10:
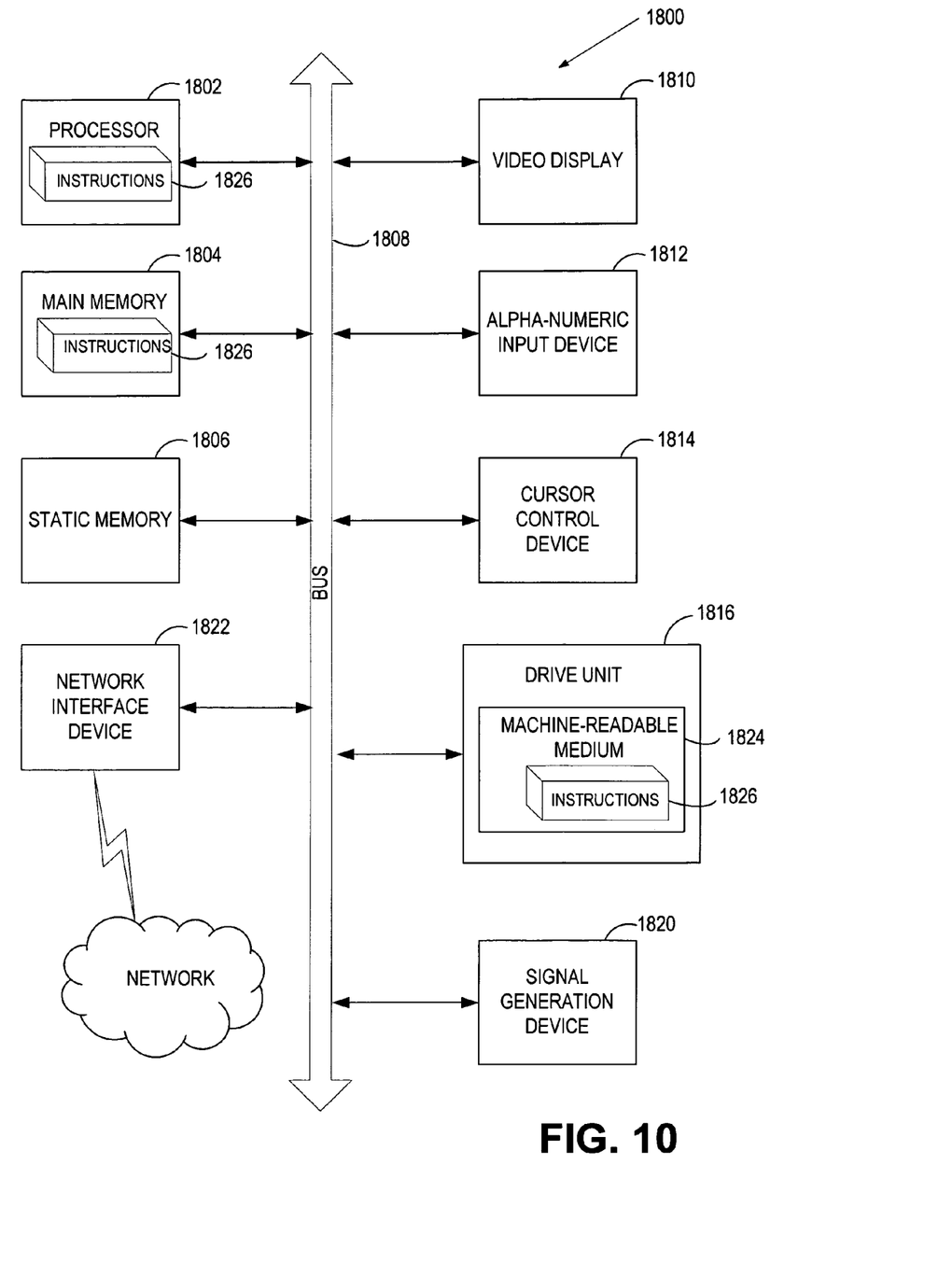
FIG. 10 is a block diagram illustrating an example computer system according to one embodiment of the present invention.

The computer system 1800 includes a processor 1802, a main memory 1804 and a static memory 1806, which communicate with each other via a bus 1808. The computer system 1800 may further include a video display unit 1810 (e.g., a liquid crystal display (LCD) or a cathode ray tube (CRT)). The computer system 1800 also includes an alpha-numeric input device 1812 (e.g., a keyboard), a cursor control device 1814 (e.g., a mouse), a disk drive unit 1816, a signal generation device 1820 (e.g., a speaker) and a network interface device 1822.

The disk drive unit 1816 includes a machine-readable medium 1824 on which is stored a set of instructions (i.e., software) 1826 embodying any one, or all, of the methodologies described above. The software 1826 is also shown to reside, completely or at least partially, within the main memory 1804 and/or within the processor 1802. The software 1826 may further be transmitted or received via the network interface device 1822. For the purposes of this specification, the term "machine-readable medium" shall be taken to include any medium that is capable of storing or encoding a sequence of instructions for execution by the computer and that cause the computer to perform any one of the methodologies of the present invention. The term "machine-readable medium" shall accordingly be taken to included, but not be limited to, solid-state memories, optical and magnetic disks, and carrier wave signals.

General Matters

In the description above, for the purposes of explanation, numerous specific details have been set forth. However, it is understood that embodiments of the invention may be practiced without these specific details. In other instances, well-known circuits, structures and techniques have not been shown in detail in order not to obscure the understanding of this description.

Embodiments of the present invention include various processes. The processes may be performed by hardware components or may be embodied in machine-executable instructions, which may be used to cause one or more processors programmed with the instructions to perform the processes. Alternatively, the processes may be performed by a combination of hardware and software.

Embodiments of the present invention may be provided as a computer program product that may include a machine-readable medium having stored thereon instructions, which may be used to program a computer (or other electronic device) to perform a process according to one or more embodiments of the present invention. The machine-readable medium may include, but is not limited to, floppy diskettes, optical disks, compact disc read-only memories (CD-ROMs), and magneto-optical disks, read-only memories (ROMs), random access memories (RAMs), erasable programmable read-only memories (EPROMs), electrically erasable programmable read-only memories (EEPROMs), magnetic or optical cards, flash memory, or other type of media/machine-readable medium suitable for storing instructions. Moreover, embodiments of the present invention may also be downloaded as a computer program product, wherein the program may be transferred from a remote computer to a requesting computer by way of data signals embodied in a carrier wave or other propagation medium via a communication link (e.g., a modem or network connection).

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A method comprising:
converting, via a processor, a computer program authored in a type-safe and memory-safe programming language and stored in a memory coupled to the processor into an intermediate representation, the intermediate representation containing a first safety check of an object reference used in a first operation included in a first and a second instruction of the computer program, wherein the first safety check throws an exception to exit the program in a safe manner when the object reference is unsafe and the safety check comprises one of a null check, a zero check, a type check, a memory address check, and an array bounds check;
defining a safety value in the intermediate representation corresponding to the first safety check;
overloading the first operation in the first and the second instruction with a second operation that accepts the safety value as an additional argument:
determining a second safety check of the object reference associated with the second instruction is redundant with respect to the first safety check;
identifying a reason why the second safety check is redundant;
associating an additional safety value with the identified reason;
eliminating the second safety check from the intermediate representation; and
performing code-motion optimization on the first and the second instruction.

2. The method of claim 1, further comprising substituting the additional safety value for the safety value as the additional argument of the overloaded operation associated with the second safety cheek.

3. The method of claim 1, wherein identifying the reason why the second safety check is redundant comprises identifying a branch of an execution path being taken.

4. The method of claim 3, wherein associating the additional safety value with the identified reason comprises defining the additional safety value as the branch being taken.

5. A computer system comprising:
a network interface to download a computer program in a type-safe computer language;
a memory to store the computer program; and
a processor to convert the computer program into an intermediate representation, the intermediate representation to contain
a first safety check of an object reference used in a first operation included in a first and a second instruction of the computer program,
a safety value defined in the intermediate representation corresponding to the first safety check, the first safety check to comprise one of a null check, a zero check, a type check, a memory address check, and an array bounds check, and
a second operation to overload the first operation and to accept the safety value as an additional argument,
wherein the processor further to execute a module to
determine a second safety check of the object reference, associated with the second instruction is redundant with respect to the first safety check,
identify a reason why the second safety check is redundant,
associate an additional safety value with the identified reason,
eliminate the second safety check from the intermediate representation, and
perform code-motion optimization on the first and the second instruction.

6. A machine-readable storage medium having stored thereon data representing instructions that, when executed by a processor, cause the processor to perform operations comprising:
converting, via a processor, a computer program stored in a memory coupled to the processor into an intermediate representation, the intermediate representation containing a first safety check of an object reference used in a first operation included in a first and a second instruction of the computer program;
defining a safety value in the intermediate representation corresponding to the first safety check;
overloading the first operation in the first and the second instruction with a second operation that accepts the safety value as an additional argument;
determining a second safety check of the object reference associated with the second instruction is redundant with respect to the first safety check;
identifying a reason why the second safety check is redundant;
associating an additional safety value with the identified reason;
eliminating the second safety check from the intermediate representation; and
performing code-motion optimization on the first and the second instruction, wherein the computer program comprises a computer program authored in a type-safe and memory-safe programming language, and the first safety check comprises one of a null check, a zero check, a type check, a memory address check, and an array bounds check.

7. The machine-readable storage medium of claim 6, further comprising substituting the additional safety value for the safety value as the additional argument of the overloaded operation associated with the second safety check.

8. The machine-readable storage medium of claim 6, wherein identifying the reason why the second safety check is redundant comprises identifying a branch of an execution path being taken.

9. The machine-readable storage medium of claim 8, wherein associating the additional safety value with the identified reason comprises defining the additional safety value as the branch being taken.

10. The system of claim 5, wherein the module comprises a compiler.

11. The system of claim 5, wherein the module comprises a computer program verifier independent of a compiler.

* * * * *